(12) United States Patent
Liu et al.

(10) Patent No.: US 7,487,374 B2
(45) Date of Patent: Feb. 3, 2009

(54) DYNAMIC POWER AND CLOCK-GATING METHOD AND CIRCUITRY WITH SLEEP MODE BASED ON ESTIMATED TIME FOR RECEIPT OF NEXT WAKE-UP SIGNAL

(75) Inventors: Ying Liu, Austin, TX (US); Jente B. Kuang, Austin, TX (US); Hung C. Ngo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/034,556

(22) Filed: Jan. 13, 2005

(65) Prior Publication Data

US 2006/0156043 A1   Jul. 13, 2006

(51) Int. Cl.
G06F 1/32 (2006.01)
(52) U.S. Cl. .................... 713/323; 713/320
(58) Field of Classification Search ............. 713/300, 713/320, 323
See application file for complete search history.

(56) References Cited

U.S. PATENT DOCUMENTS 5,400,190 A * 3/1995 Miura .................... 360/69
5,481,733 A * 1/1996 Douglis et al. ............ 713/324
5,774,292 A * 6/1998 Georgiou et al. ......... 360/73.03
6,553,501 B1 * 4/2003 Yokoe ..................... 713/320

OTHER PUBLICATIONS

Zhigang Hu et al. "Microarchitectural Techniques for Power Gating of Execution Units," *IBM T.J. Watson Research Center*, 2004, pp. 32-37.

* cited by examiner

*Primary Examiner*—Thomas Lee
*Assistant Examiner*—Albert Wang
(74) *Attorney, Agent, or Firm*—Casimer K. Salys; Winstead, P.C.

(57) ABSTRACT

Power-gated circuitry is put in a "sleep mode" that selectively gates both the power supply rails for static power control and the clock distribution for dynamic power control. A time interval M is established following a wake-up signal that includes the time to power-up, perform a computation, and return a result to the following circuitry. Likewise, a time interval N is established that indicates how long to wait after a result is returned before the power-gated circuitry is returned to the sleep mode to assure a desired performance. When a power-gated circuit is going to be needed for a future computation, it is issued a wake-up signal and a predetermined estimated time K for receipt of a next wake-up signal. A decision is made by analyzing the times M, N, and K as to when to return a power-gated circuit to the sleep mode following activation by a wake-up signal.

21 Claims, 7 Drawing Sheets

DYNAMIC POWER AND CLOCK-GATING METHOD AND CIRCUITRY WITH SLEEP MODE BASED ON ESTIMATED TIME FOR RECEIPT OF NEXT WAKE-UP SIGNAL

GOVERNMENT RIGHTS

This invention was made with Government support under PERCS II, NBCH30390004, BGR W0132280 awarded by PERCS. The Government has certain rights in this invention.

CROSS-REFERENCE TO RELATED APPLICATIONS

The present invention is related to U.S. patent application Ser. No. 10/821,047, filed Apr. 8, 2004, entitled "AN INTERFACE CIRCUIT FOR COUPLING BETWEEN LOGIC CIRCUIT DOMAINS,"

U.S. patent application Ser. No. 10/821,048, filed Apr. 8, 2004, entitled "BUFFER/DRIVER CIRCUITS," and U.S. patent application Ser. No. 10/835,501, filed Apr. 29, 2004, entitled "SELF LIMITING GATE LEAKAGE DRIVER," which are incorporated by reference herein.

TECHNICAL FIELD

The present invention relates in general to complementary metal oxide semiconductor (CMOS) circuits and, in particular, to circuit methodologies for implementing power and clock gating to control static and dynamic power.

BACKGROUND INFORMATION

Oxide tunneling current in metal oxide silicon (MOS) field effect transistors (FET) is a non-negligible component of power consumption as gate oxides get thinner, and may in the future become the dominant leakage mechanism in sub-100 nm complementary MOS (CMOS) circuits. The gate current is dependent on various conditions for a single transistor and three main static regions of operation may be identified for a MOSFET. The amount of gate-leakage current differs by several orders of magnitude from one region to another. Whether a transistor leaks significantly or not is also affected by its position in relation to other transistors within a CMOS circuit structure as this affects the voltage stress to which a particular device is subjected.

The three regions of operation are a function of applied bias if one only considers the parameters that affect the magnitude of gate current in a MOSFET as it operates in relation to other MOSFETs. Assuming that the supply voltage (Vdd) and the threshold voltage (Vt) are fixed, then a MOSFET in a static CMOS logic gate operates in one to the three regions, each with a significantly different amount of gate leakage.

The first region is called "strong inversion" and is the region where a MOSFET operates with the absolute value of the gate to source voltage (|VGS|) equal to Vdd. The gate-leakage current density for an N-channel FET (NFET) in strong inversion may be as high as $10^3$ amperes square centimeter (A/cm$^2$) for an oxide thickness of 1.5 nanometers (nm) at Vdd equal to 3 volts (V). For such a thin oxide, a more realistic value for Vdd is 1.2 V, in which case the gate-leakage current would more likely be 20 A/cm$^2$.

The second region is called the "threshold" region where |VGS|=Vt. A MOSFET operating in the threshold region will leak significantly less than one operating in the strong inversion region, typically 3 to 6 orders of magnitude less depending on Vdd and the oxide thickness.

The third region is called the "Off" region where |VGS|=0.0 V. For an NFET operating in the Off region, there is no leakage if the drain voltage (Vd)=0.0 V. However, if Vd is equal to Vdd, then a small leakage current in the reverse direction (drain to gate) may be present due to gate-drain overlap area. Of course this current depends on transistor geometry and is typically 10 orders of magnitude less than the gate-leakage current in the strong inversion region.

The above three regions represent three distinct conditions or states for the channel of a MOSFET. Whether an "ON" transistor operates at strong inversion or at threshold is determined by its position inside a logic circuit structure as well as by the state of other transistors in the circuit structure.

Both NFETs and P-channel FETs (PFETs) in a logic circuit structure operate in one of the three regions described above. However, the main tunneling current in a PFET device in strong inversion is due to hole tunneling from the valence band and the main tunneling current in an NFET device in strong inversion is due to electron tunneling from the conduction band. Because of this, PFET gate currents are about 10 times smaller than equivalent sized NFET devices. This fact is important in assessing gate-leakage in a static CMOS circuit.

Since gate leakage currents are measured as current density, it follows that the gate-leakage current in a MOSFET is directly proportional to the gate area (width times length). Transistor sizing, therefore, has a direct impact on the amount of gate-leakage in a CMOS logic circuit.

As CMOS circuits become smaller, leakage current that results when voltage is applied to the gate of the field effect transistors becomes a significant portion of the power dissipation. Leakage power may become the limiting factor in how small devices may be manufactured. As devices are made smaller, the power supply voltage is correspondingly reduced. However, this may not achieve an adequate reduction in leakage power dissipation. Alternate techniques are being employed to reduce leakage power. One popular technique is to use power-gating to isolate the power supply voltage in groups of circuits at controlled times. These circuits are sometimes referred to as being part of a power-gated domain. Other circuits may be evaluating a logic function and may not be in a power-gated domain. Interfacing between circuits in a power-gated domain and circuits in a non-power-gated domain may prove difficult. The state of an output from a power-gated domain may be uncertain during the time period of power-gating. While the benefits of power-gating are known, there is no consensus on strategies to preserve logic states of outputs in the power-gated domains. Since power-gated domains may be variable, the method of preserving output logic states from circuits in a power-gated domain are controlled by the power-gating control signals themselves.

The current drive capability of a CMOS buffer depends on the channel size of devices used to drive outputs or to drive many other logic gate inputs. Therefore, one would expect the large devices to exhibit large gate-leakage current when the technology has gate oxides that are very thin. Likewise, logic regions with a high number of logic gates may exhibit a large gate-leakage current due to the large number of devices that are in strong inversion at any one static time (between clock transitions). Logic regions with a high number of logic gates may employ power supply gating whereby the power to the logic devices are decoupled by the action MOSFETs, PFETs for the positive power supply voltage and NFETs for the negative power supply voltage.

Power-gating primarily affects the static power of a circuit. The dynamic power of complementary metal oxide semiconductor (CMOS) circuitry (using NFETs and PFETs) occurs during switching when the circuit capacitances are being charged and discharged during state change. This dynamic power is proportional to the total capacitance switched, the square of the voltage levels to which the capacitance is charged, and the switching frequency. Many of the circuits in computer systems are clocked and thus no switching or state changes occur except when triggered by a state change of a master clock signal. The fact that a clock is distributed to a large number of clocked circuits insures dynamic power is dissipated even if the circuit is not being used for computation during a particular time interval. If a block of circuit is not being used, then the combination of power-gating and clock gating may significantly reduce the power dissipated in the block.

If a circuit block is again required for computation, then the corresponding power circuits and the clock circuits are reactivated ahead of the time since restoration (wake-up) of these circuits takes time. In the case of power supply gating, a wake-up process may take a time corresponding to several clock cycles due to the slower nature of charging a large amount of capacitance elements. When the clock is gated, on the other hand, re-activation is typically faster. For a high performance processor the clock re-activation process, including transmission of clock gate signals from a control circuit block to local clock buffers and latches and dynamic circuits receiving the clocks, typically takes a time less than one clock cycle.

Dynamic control of power and clock gating requires a wake-up signal to activate a "sleeping" circuit block far enough ahead so that the power and clock circuitry can be re-activated and stabilized before it is needed for computation. Likewise, after a computation result has been generated, it would be advantageous not to return to the sleep mode if the circuit block is going to be needed again within a predetermined time interval. This action is used to balance performance and power consumption.

There is, therefore, a need for a method and circuitry for dynamically determining when to turn OFF power and clock-gating circuits controlling a circuit block to conserve power. There is also a need for a method and circuitry for dynamically determining how long to stay in the power and clock gated mode before re-activating the circuit block while minimizing the affects on system performance.

SUMMARY OF THE INVENTION

Circuit blocks incorporate devices for coupling the power supply voltage potentials to virtual power rails. Power-gated circuits have their power supply terminals coupled to the virtual power rails so that power to these circuits may be controlled to reduce the static leakage power. Additionally, clock buffers that fan-out the clock signals to large numbers of clocked circuits are also coupled to clock gating control signals that enable the clock to be de-gated to reduce dynamic power dissipation. The circuit blocks have control circuits that are coupled directly to the power supply and are not power gated. These control circuits receive the wake-up signal and determine when to apply power-gating and clock gating to the circuit blocks.

Since it may take a time equal to multiple clock cycles to re-activate power to the circuit block, the wake-up signal is generated ahead of when the circuit block is required for computation. Two time intervals are generated, the first time interval corresponds to the time it takes to re-active the circuit block, plus the time it takes to do the computation and report the results to the following stages. Likewise, an estimate is made as to when the circuit block may be again needed after it has been re-activated so that it is maintained in an active state for a second time interval following the first time interval anticipating a future need of the circuit block to perform a computation.

For computer circuitry executing a program of instructions, look-ahead circuitry analyzes an instruction cache and determines future instructions and corresponding circuit blocks that are needed for the future computations. A wake-up signal generator generates wake-up signals for distribution to various circuit blocks that employ power and clock-gating. By monitoring and analyzing the history of circuit block usage, the wake-up signal generation also generates an estimate of when next the circuit block will be needed after the present wake-up signal. The first time interval and the second time interval are loaded into registers and may be dynamically modified. When a wake-up signal and the estimated next wake-up time K are received by a circuit block, its control circuits determine if the estimated next wake-up time K is less than or greater than the sum of the first and second time intervals (Sum). If K is greater that the Sum, then the circuit block is set to the "sleep" mode after the first time interval. If K is less than the Sum, then the circuit block is set to "sleep" mode after the time out of the second time interval following the first time interval.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, and the like have been omitted inasmuch as such details are not necessary to obtain a complete understanding of the present invention and are within the skills of persons of ordinary skill in the relevant art.

In the following, power supply voltage potentials are distributed to circuits on circuit traces or printed wires which may be referred to interchangeably as power supply rails, grids or buses. Power supply voltage potentials are coupled to the buses or grids to activate various logic circuitry. The power supply voltage potentials may be referred to simply as positive potential or ground potential. The "voltage" term may be dropped for simplicity with the understanding that all the potentials are voltage potentials. Embodiments of the present invention employ power-gating circuitry for generating "virtual" power supply rails (power rails) where switching devices couple and decouple the power rails from the power supply potential. The term virtual may be dropped to simplify circuit descriptions.

Refer now to the drawings wherein depicted elements are not necessarily shown to scale and wherein like or similar elements are designated by the same reference numeral through the several views.

Figure 1:
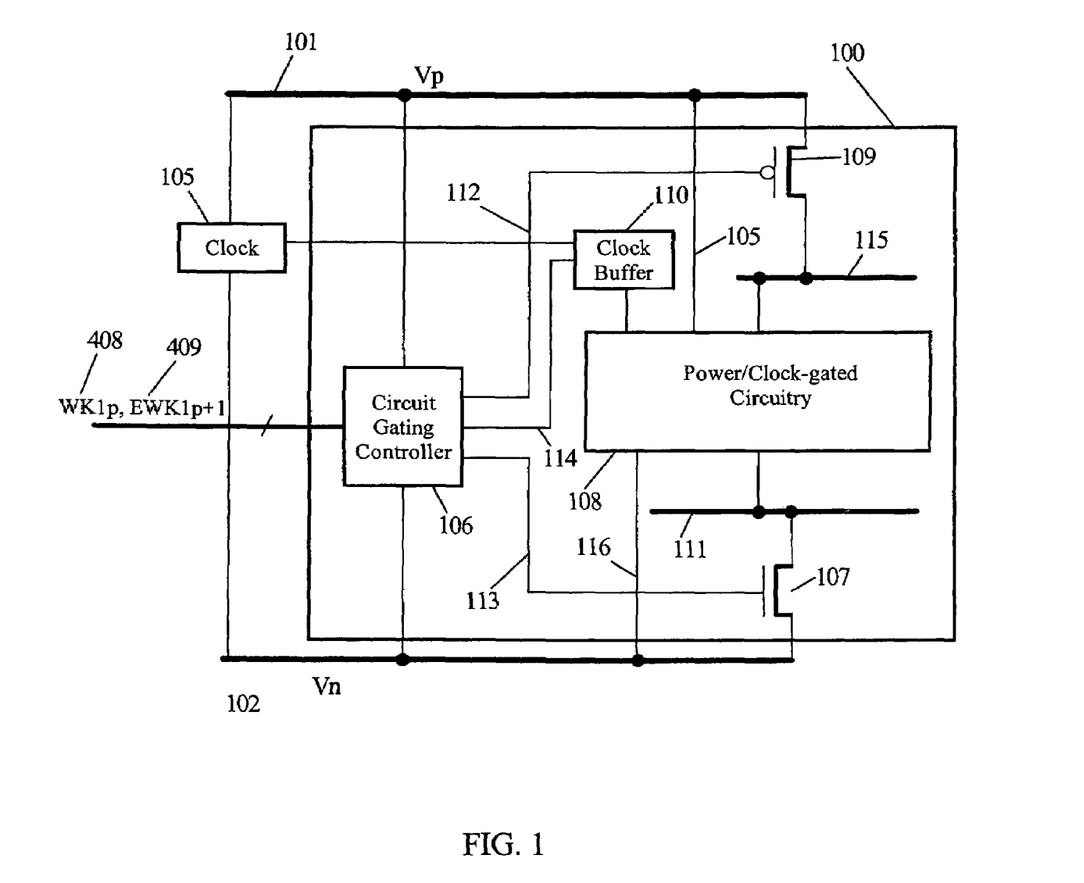
FIG. 1 is a block diagram of power-gating and clock-gating applied to a circuit block according to embodiments of the present invention.

FIG. 1 is a block circuit diagram of power/clock-gating according to embodiments of the present invention. Circuit block 100 is powered by power supply voltage potentials Vp 101 and Vn 102. Circuit gating controller (CGC) 106 is always ON and is directly coupled to Vp 101 and Vn 102. Power/clock-gated (PCG) circuitry 108 is powered by virtual power supply rails 115 and 111. Power rail 115 is coupled and decoupled from Vp 101 by PFET 109 in response to control signal 112 from CGC 106. Likewise, power rail 111 is coupled and decoupled from Vn 102 by NFET 107 in response to control signal 113 from CGC 106. Clock generator 105 couples clock 103 to Clock Buffer 110. Clock Buffer 110 distributes clock signals to various clocked circuits in PCG 108. Clock Buffer 110 is gated by control signal 114 from CGC 106. CGC 106 receives wake-up signal WK(1)p and estimated next wake-up signal time EWK(1)p+1. CGC 106 uses this information to determine when to turn ON and OFF PFET 109 and NFET 107 as well as Clock Buffer 110. Additional circuitry in PCG 108 may be coupled directly to Vp 101 (connection 105) and Vn 102 (connection 116) wherein this circuitry is necessary to hold various logic states during power gating of PCG 108.

Figure 2:
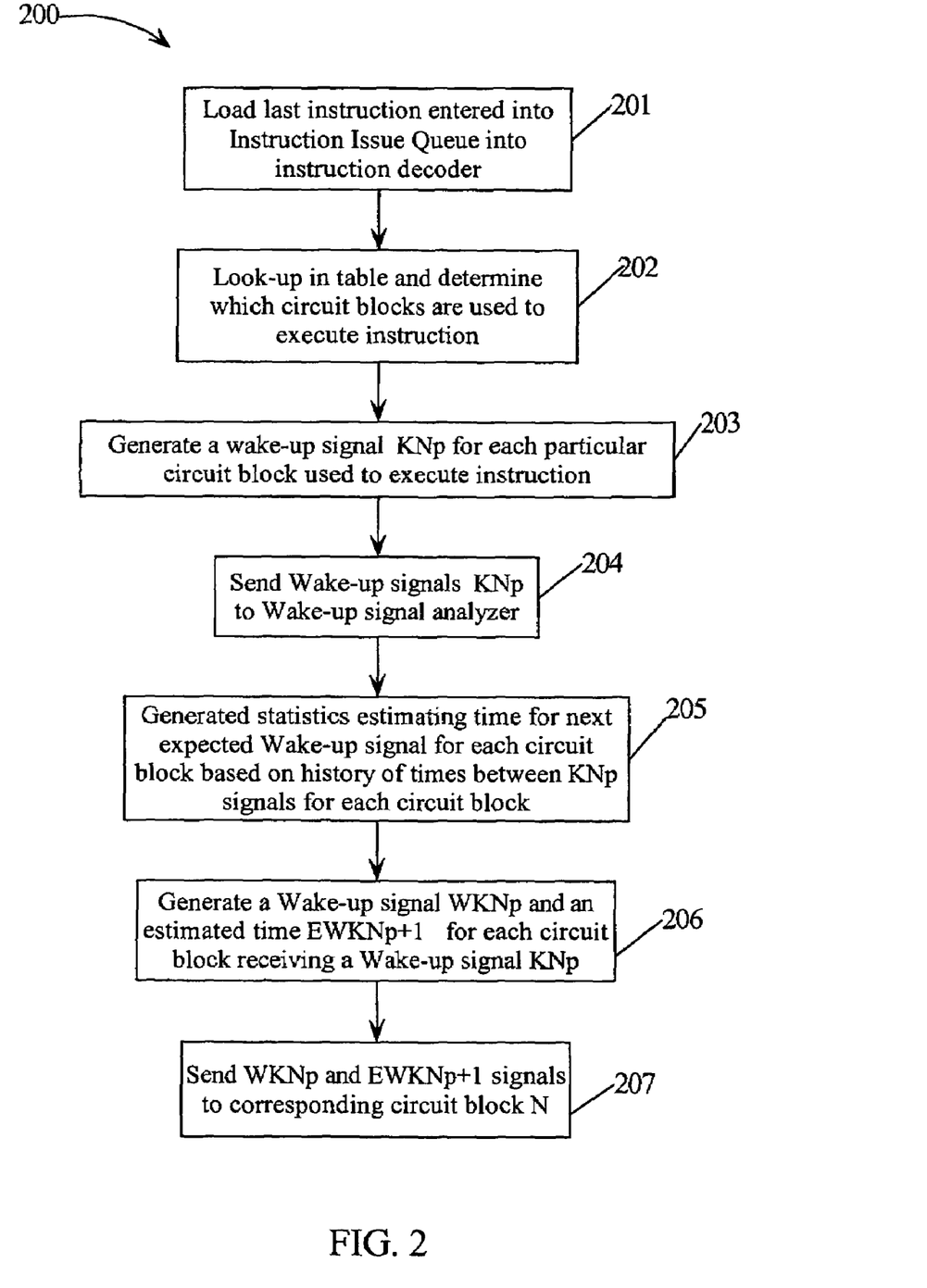
FIG. 2 is a flow diagram of method steps used in embodiments of the present invention.

FIG. 2 is a flow diagram of steps used to look ahead and determine which PCGs (e.g., PCG (1) 108) will be needed for each upcoming instruction so that they may receive wake-up signals far enough ahead of time so that they are ON (power and clock) when needed to execute instructions. In step 201, the last instruction entered into an Instruction Issue Queue (IIQ) is decoded. In step 202, a table look-up is executed to determine which PCG circuit blocks (each identified by a number N) will be needed for the future instruction when it issued for execution. In step 203, a wake-up signal K(N)p for each particular PCG used to execute the instruction is generated at a time period (defined by "p"). The K(N)p signals are sent to a wake-up signal analyzer in step 204. In step 205, statistics are generated for estimating the time for a next expected wake-up for each PCG (N) based on the history of times between K(N)p signals for each PCG (N). In step 206, a wake-up signal WK(N)p and an estimated time EWK(N)p+1 (next time "p+1" after time period "p") is generated for each PCG (N) used for the instruction. In step 207, the WK(N)p signals and EWK(N)p+1 signals are sent to the corresponding PCG (N) circuits.

Figure 3:
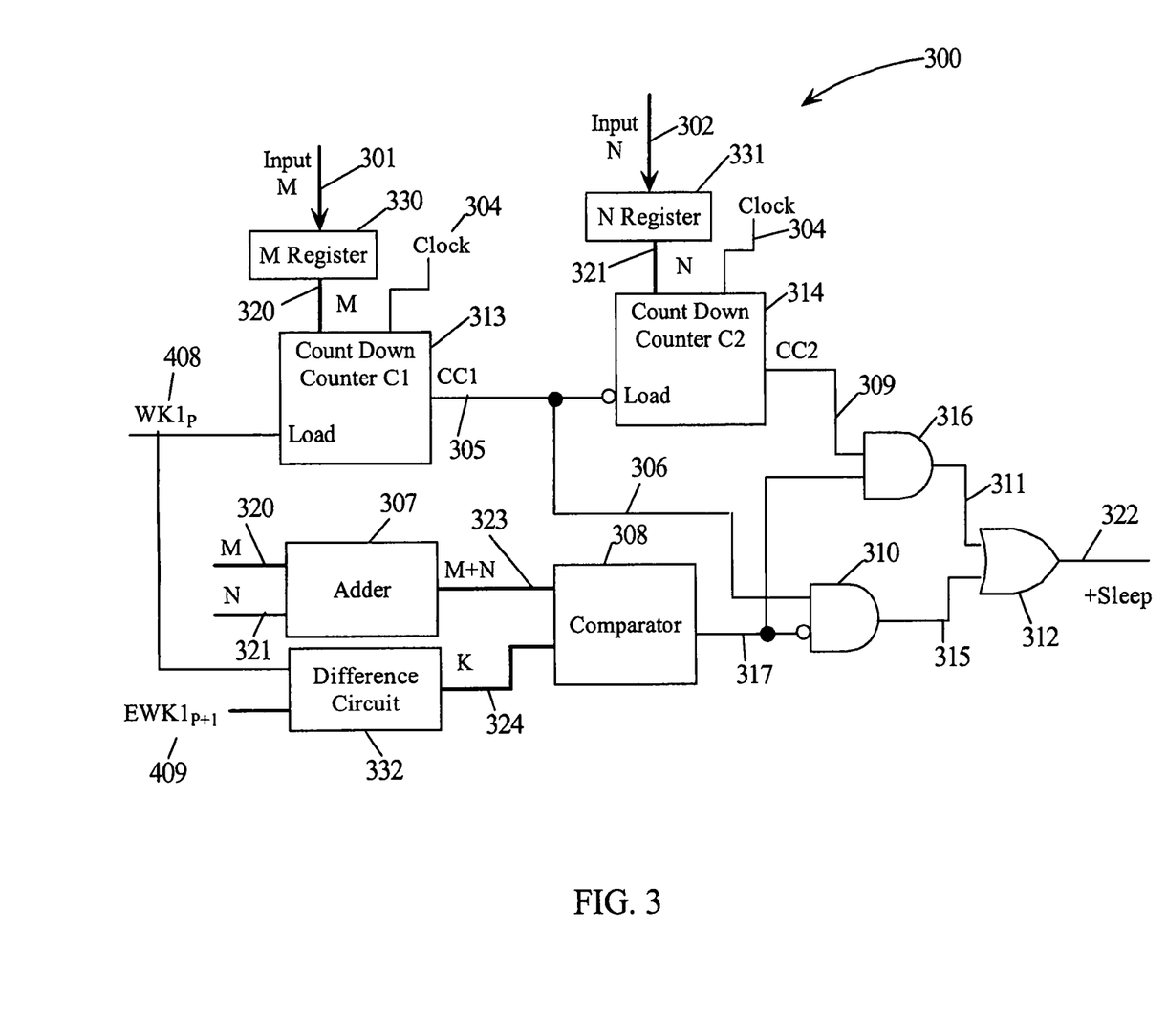
FIG. 3 is a circuit block diagram of circuitry for generating a start wake-up signal for power/clock-gated circuitry.

FIG. 3 is a circuit block diagram of circuitry 300 for generating a start wake-up sequence at a particular CGC controller (e.g., CGC 106 for PCG (1)). CGC 106 receives wake-up signal WK(1)p 408 and estimated time EWK(1)p+1 409 for arrival of the next wake-up signal WK(1)p+1. WK(1)p 408 triggers a load of a value M 320 into count down counter C1 313. Value M 320 is stored in a M register 330 which is updated from input 301. Value M 320 corresponds to the time interval necessary for PCG (1) to power-up, compute a value, and transmit the computed value to the next circuitry. Therefore, value M 320 corresponds to the time interval PCG (1) is set to the wake-up (power and clock ON) condition. C1 313 counts down from value M 320 in response to clock 304. When C1 313 reaches a count of zero, signal CC1 305 transitions to a logic one and remains at a logic one until value M 320 is again loaded in response to the arrival of wake-up signal WK(1)p 408.

Another count-down counter C2 314 is loaded with a value N 321 from N register 331. N register 331 is updated with input 302. Value N 321 is to the time interval PCG (1) remains ON after the time interval corresponding to value M. Value N 321 is determined by monitoring the activity for PCG (1) or by past knowledge of the activity of circuitry like PCG (1). When CC1 305 transitions to a logic one, the value N 321 is loaded in to C2 314. C2 314 also counts down in response to clock 304. When C2 314 reaches a count of zero, signal CC2 309 transitions to a logic one and remains at a logic one until value N 321 is again loaded in response to the transition to a logic one by CC1 305.

Values M 320 and N 321 are added in adder 307 generating sum value M+N 323. A difference circuit 332 is used to determine the time K 324 when the next wake-up signal is expected after the arrival of WK(1)p 408. K 324 is compared to M+N 323 in comparator 308. If K 324 is greater than M+N 323, then it is expected that the next time exemplary PCG (1) will be needed after WK(1)p is received is after the time defined by the sum of the values M 320 and N. Since nothing will be lost, PCG (1) is set to the "Sleep" mode immediately after a time interval corresponding to the value M 320 after receipt of WK(1)p 408. If K 324 is anywhere within the time corresponding to the sum of values M 320 and N, then PCG (1) is set to the "Sleep" mode immediately after the time corresponding to the sum of values M 320 and N.

If K 324 is greater than the value M+N 323, then the output 317 transitions to a logic zero enabling AND gate 310. In this case, when CC1 305 transitions to a logic one after C1 313 counts to zero from M, then output 315 transitions to a logic one and OR gate 312 generates a "Sleep" signal at output 322 as a logic one. If K 324 is less than the value M+N 323, then the output 317 transitions to a logic one disabling AND gate 310 and enabling AND gate 316. In this case, output 322 generates a "Sleep" signal as a logic one when C2 314 counts down from value N 321 after C1 313 counts down from value M, therefore after a time period corresponding to the value of M+N after wake-up signal WK(1)p 408 is received. As soon as a new WK(1)p 408 is received C1 313 is loaded with value M 320 and CC1 305 transitions to a logic zero and output 315 transitions to a logic zero. When CC1 305 transitions to a logic zero, C 314 is loaded with value N 321 and CC2 309 transitions to a logic zero and output 311 also transitions to a logic zero. With both output 311 and output 315 at a logic zero, output 322 is also a logic zero signaling a start wake-up.

Values M 320 and N 321 may be determined based on the characteristics of PCG circuitry, may be hard coded, or they may be made programmable as illustrated in FIG. 3. The programmability of values M 320 and N 321 may also be variable. At the beginning of each wake-up sequence, specific values may be inputted for values M 320 and N 321 to accommodate different modes of operations of an exemplary PCG (1) frequently used in contemporary designs. The programmable nature of values M 320 and N 321 may be utilized to measure the power consumption pattern of exemplary PCG (1) as an energy usage characterization tool. By adjusting the settings of the M and N values to characterize the power efficiency, optimal Sleep and Wake intervals may be retrieved for any given design.

In another embodiment, activity history tables may be designed to update the settings of values M 320 and N 321 in the course of operation, thus realizing time-dependent optimizations. When two or more PCG circuit blocks share the same power or clock gating structure, the combined values of M 320 and N 321 may be selected by assigning a value M 320 to all PCG circuit blocks corresponding to the maximum of the M 320 values (e.g., M=max of M1, M2, . . . ) where M1 corresponds to PCG (1), etc. Likewise, a value N 321 is assigned to all PCG circuit blocks corresponding to the maximum of the N values (e.g., e.g., N=max of N1, N2, . . . ) where N1 also corresponds to PCG (1), etc. This will assure that interaction between PCG (1), PCG (2), . . . . PCG (N) is glitchless.

If a PCG takes multiple clock cycles to generate a result and has values M 320 and N 321, these M and N values would therefore comprise times extending multiple clock cycles. Sub-circuits with this PCG would then require ON and OFF characteristics that would be characterized with values.

Figure 4:
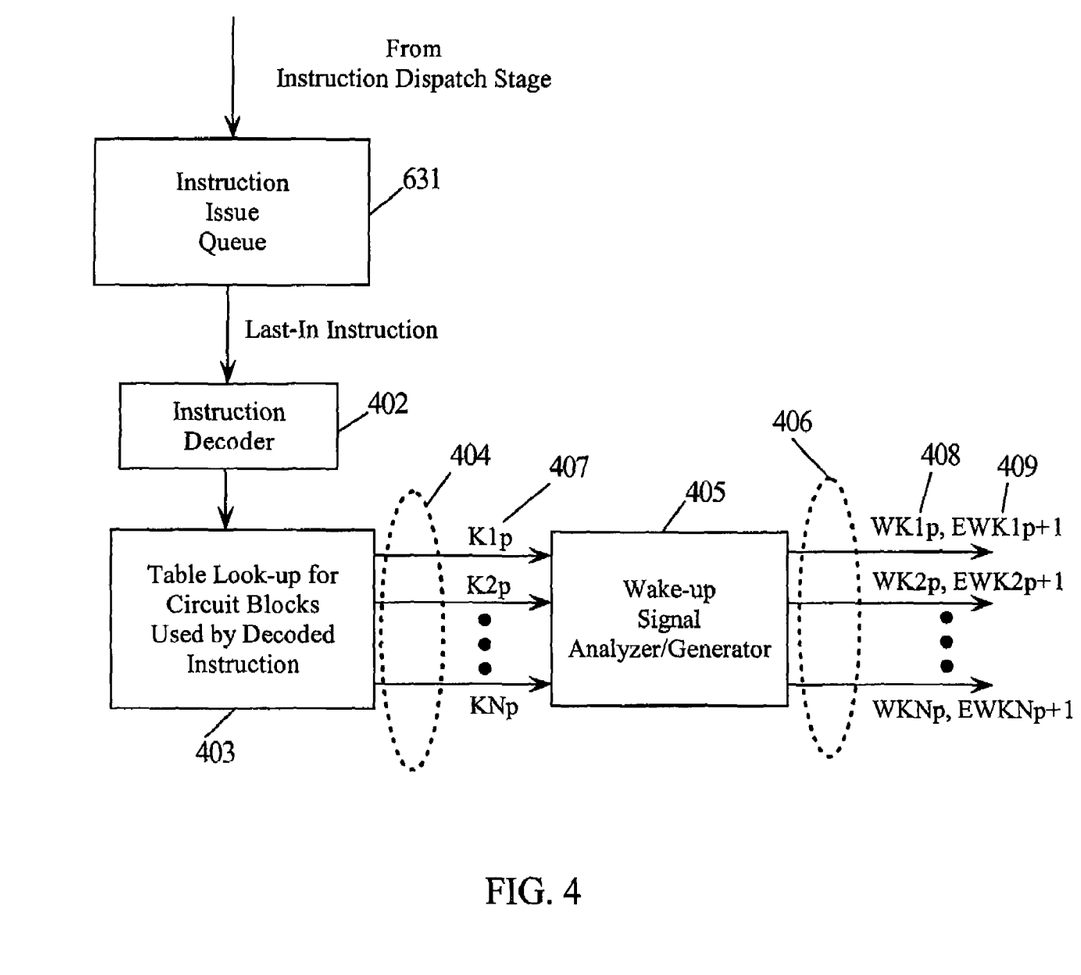
FIG. 4 is a circuit block diagram of circuitry for determining which particular circuit blocks will be needed to execute the instructions in an Instruction Issue Queue and generating a wake-up signal and an estimated next wake-up signal.

FIG. 4 is a circuit block diagram illustrating generation of a wake-up signal and an expected time for a next wake-up signal. Instruction Issue Queue 631 receives instructions from an Instruction Dispatch Stage 640 (See, FIG. 6). The last-in instruction is decoded in an Instruction Decoder 402. The decode information is used in a table look-up circuit 403 which determines which PCG (N) circuit blocks need to be activated for the instruction. Wake-up signals K(1)p-K(N)p 404 are sent to the wake-up signal analyzer/generator WG 405. WG 405 generates signals 406, wake-up signals WK(1)p-WK(N)p and expected times EWK(1)p+1-EWK(N)p+1, for a next wake-up signals. Particular wake-up signal WK(1)p 408 and expected time EWK(1)p+1 409, for example, are sent to PCG (1).

Figure 5:
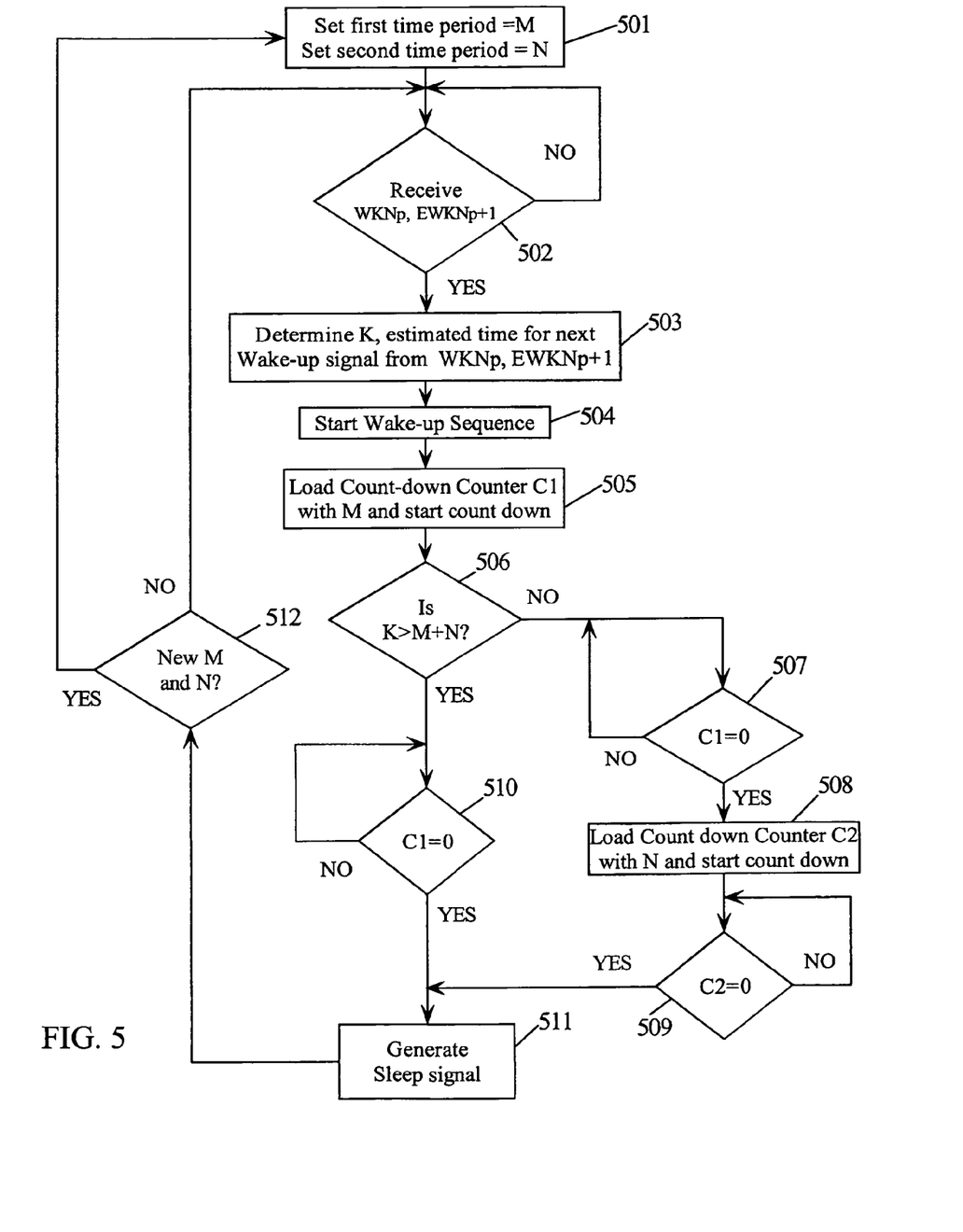
FIG. 5 is a flow diagram of method steps used in embodiments of the present invention.

FIG. 5 is a flow diagram of method steps in embodiments of the present invention. In step 501, a first time period M 320 and a second time period N 321 are set. In step 502, a test is done to determine if a wake-up signal WK(N)p (for circuit N at time p) and an estimated next wake-up signal EWK(N)p+1 (for circuit N at next time p+1) have been received. If the result of the test in step 502 is NO, then a wait is executed. If the result of the test in step 502 is YES, then in step 503, a determination of the estimated time K for the next wake-up signal is made. In step 504, a wake-up sequence is started. In step 505, a count-down counter C1 is loaded with the value M 320 and count-down is started. In step 506, a test is done to determine if K is greater than the sum of M 320 and N. If the result of the test is NO, then in step 507, a test is done to determine if the count in C1=0. If the result of the test in step 507 is NO, then a wait is executed until C1=0. When C1=0, then a Count-down counter C2 is loaded with the value N and a count-down is started. In step 509, a test is done to determine if the count C2=0. If the result of the test in step 509 is NO, then a wait is executed until C2=0. If the result of the test in step 509 is YES, then a Sleep signal is generated in step 511.

If the result of the test in step 506 is YES, then in step 510 a test is done to determine if the count C1=0. If the result of the test in step 510 is NO, then a wait is executed until C1=0. If the result of the test in step 510 is YES, then the Sleep signal is generated in step 511. After the Sleep signal is generated in step 511, a test is done in step 512 to determine if a new M 320 and N 321 have been set. If the result of the test in step 512 is NO, then a branch is taken to step 502 awaiting a new wake-up signal. If the result of the test in step 512 is YES, then a branch is taken back to step 501 and the new values for M 320 and N 321 are set.

Figure 6:
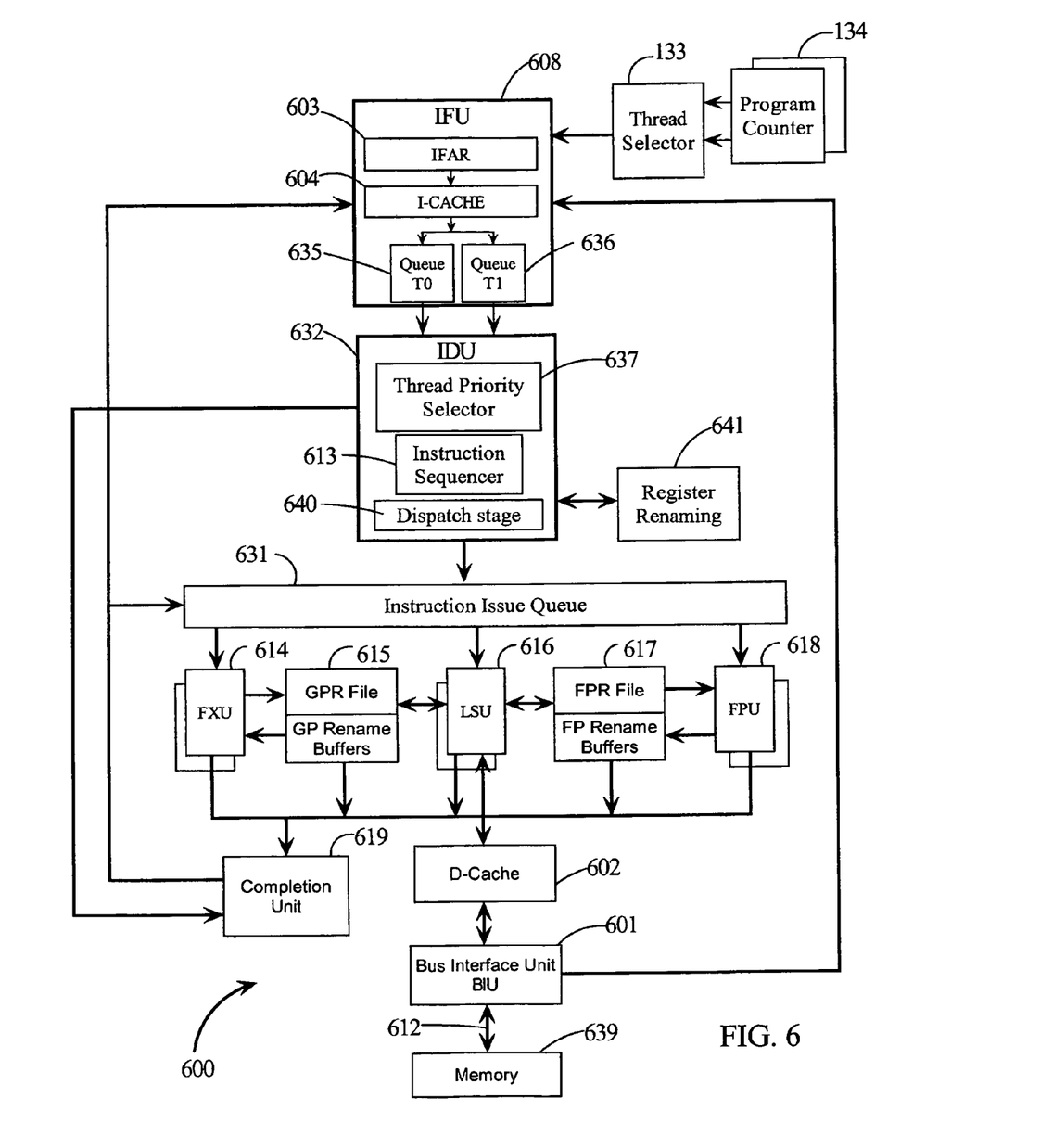
FIG. 6 is a block diagram of a system illustrating the relationship of the Instruction Issue Queue to other system functions.

Referring to FIG. 6, there are illustrated details of CPU 600 suitable for practicing embodiments of the present invention. CPU 600 is designed to execute multiple instructions per clock cycle. Thus, multiple instructions may be executing in any of the execution units, fixed point units (FXUs) 614, floating point units (FPUs) 618, and load/store units (LSUs) 616 during any one clock cycle. Likewise, CPU 600 may simultaneously execute instructions from multiple threads in an SMT mode.

Program counter (PCs) 634 corresponds to thread zero (T0) and thread one (T1) that have instructions for execution. Thread selector 633 alternately selects between T0 and T1 to couple an instruction address to instruction fetch unit (IFU) 608. Instruction addresses are loaded into instruction fetch address register (IFAR) 603. IFAR 603 alternately fetches instructions for each thread from instruction cache (I-Cache) 604. Instructions are buffered in instruction queue (IQ) 635 for T0 and IQ 636 for T1. IQ 635 and IQ 636 are coupled to instruction dispatch unit (IDU) 632. Instructions are selected and read from IQ 635 and IQ 636 under control of thread priority selector 637. Normally, thread priority selector 637 reads instructions from IQ 635 and IQ 636 substantially proportional to each thread's program controlled priority.

The instructions are decoded in a decoder (not shown) in IDU 632. Instruction sequencer 613 then may place the instructions in groups in an order determined by various algorithms. The groups of instructions are dispatched to instruction issue queue (IIQ) 631 by dispatch stage 640. The instruction sequencer 613 receives instructions from both threads in program order, but the instructions may be issued from the IIQ 631 out of program order and from either thread. The general purpose register (GPR) file 615 and floating point register (FPR) file 617 are used by multiple executing units and represent the program state of the system. These hardware registers may be referred to as the "architected" registers. When an instruction is dispatched to an issue queue, each architected register is renamed. Each architected register that is being modified is assigned a physical register and a corresponding look-up table identifies physical registers that are associated with an architected register. Therefore in the issue queues, the architected register has been renamed so that multiple copies of an architected register may exist at the same time. This allows instructions to be executed out-of-order as long as source operands are available. Register renaming unit 641 renames and maps the registers so that unused physical registers may be reassigned when all instructions referencing a particular physical register complete and the physical register does not contain the latest architected state.

Instructions are queued in IIQ 631 for execution in the appropriate execution unit. If an instruction contains a fixed point operation, then any of the multiple fixed point units (FXUs) 614 may be used. All of the execution units, FXU 614, FPU 618 and LSU 616 are coupled to completion unit 619 that has completion tables (not shown) indicating which of the issued instructions have completed and other status information. Information from completion unit 619 is forwarded to IFU 608. IDU 632 may also send information to completion unit 619. Data from a store operation from LSU 616 is coupled to data cache (D-Cache) 602. This data may be stored in D-Cache 602 for near term use and/or forwarded to bus interface unit (BIU) 601 which sends the data over bus 612 to memory 639. LSU 616 may load data from D-Cache 602 for use by the execution units (e.g., FXU 614).

SMT processor 600 has pipeline stages comprising circuitry of the IFU 608 and circuitry of the IDU 632 that is shared between two threads. Instructions are loaded into a pipeline stage alternately from each thread in program order. As the instructions are accessed from I-Cache 604, they are queued in a T0 queue 635 and a T1 queue 637. Instructions are selected from these queues either equally or according to a thread priority selector 637 which selects from each thread substantially in proportions to the thread's priority. An instruction sequencer 613 in the IDU 632 combines the instructions from each thread into instruction groups of up to five instructions per group. The instructions from the thread groups are issued to instruction issue queues 631 that feed multiple execution units (e.g., 614, 616, and 618). Instructions in the instruction groups are in program order when they are dispatched to instruction issue queues 631 and to the completion table (not shown) in completion unit 619. However, instructions may be issued to the execution units out-of-order.

A determination may be made in the IIQ 631 of which execution units are going to be needed for a future instruction. This information may be used to generate a wake-up signal WK(N)p for the unit N (e.g., one of FXU 614, LSU 616 or FPU 618) that is going to be needed at time p. Historical data may be initially used to estimate when the next wake-up signal EWK(N)p+1 will be generated for unit N. As actual instruction executions occur, analysis of actual wake-up signals may be used to predict the next wake-up signals for the circuitry receiving wake-up commands.

Figure 7A:
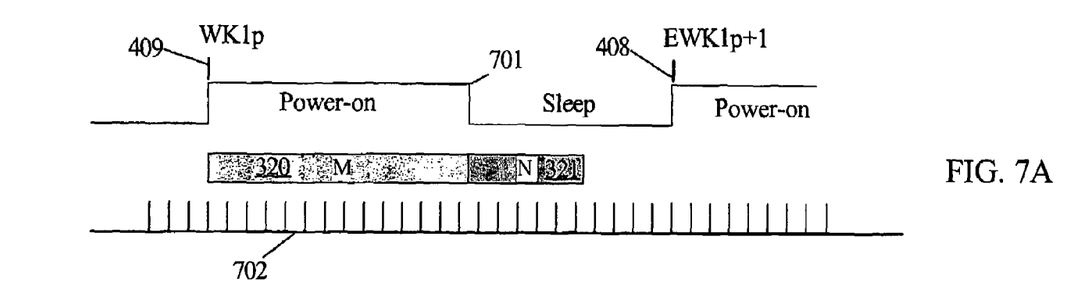
FIGS. 7A-7C are timing diagrams of various scenarios of wake-up signals and estimated next wake-up signals.
Figure 7B:
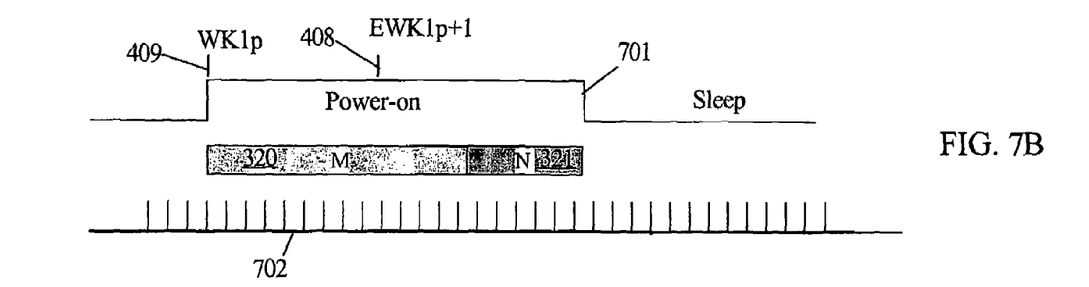
Figure 7C:
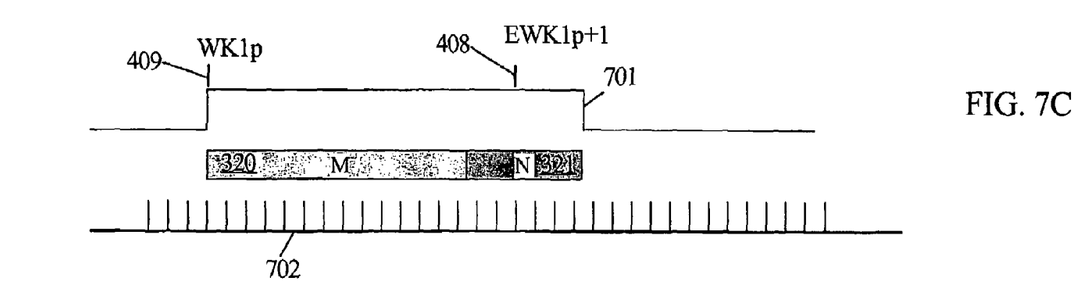

FIG. 7A-FIG. 7C are timing diagrams of three scenarios of exemplary wake-up signal WK(1)p 409 and corresponding expected time EWK(1)p+1 408 for the next wake-up signal. Time marks 702 in all three figures in FIG. 7A are for illustration only. WK(1)p 409 starts a wake-up sequence and has expected time EWK(1)p+1 408 such that the time (e.g., K 324) from WK(1)p 409 to EWK(1)p+1 is greater than the sum of the values M 320 and N 321. In this case, the Sleep mode would start immediately following a time corresponding to value M 320.

In FIG. 7B expected time EWK(1)p+1 408 is such that the time (e.g., K 324) from WK(1)p 409 to EWK(1)p+1 is less than the value M 320. In this case, the Sleep mode would start immediately following a time corresponding to the sum of the values M 320 and N 321. In FIG. 7C expected time EWK(1)p+1 408 is such that the time (e.g., K 324) from WK(1)p 409 to EWK(1)p+1 is greater than the value M 320 but less than the sum of the values M 320 and N 321. In this case, the Sleep mode would again start immediately following a time corresponding to the sum of the values M 320 and N 321.

Although the present invention and its advantages have been described in detail, it should be understood that various changes, substitutions and alterations can be made herein without departing from the spirit and scope of the invention as defined by the appended claims.

What is claimed is:

1. A method of managing power in power-gated circuits of a computer system comprising the steps of:
   receiving a first time interval M(P) and a second time interval N(P) for power-gated circuitry P;
   receiving a wake-up signal W(P) and an estimated time K(P) a next wake-up signal is expected following receipt of the wake-up signal W(P) for the power-gated circuitry P;
   determining whether K(P) is greater than a sum of M(P)+N(P);
   initiating a wake-up of the power-gated circuitry P on receipt of wake-up signal W(P); and
   generating a sleep mode signal P (SM(P))for the power-gated circuitry P after the time M(P) if K(P) is greater that the sum of M(P)+N(P) and generating the sleep mode signal for the power-gated circuitry P after the time M(P)+N(P) if K(P) is less than the sum of M(P)+N(P) and a next successive wake-up signal following W(P) has not been received.

2. The method of claim 1, wherein the time M(P) is a time required for the power-gated circuitry P to fully activate, to generate a computational result, and to report the computational result to succeeding circuitry.

3. The method of claim 1, wherein the time interval N(P) is a predetermined time that the power-gated circuitry P should remain ON after the time interval corresponding to time M(P).

4. The method of claim 1, wherein one or more power rails supplying power from a power supply to the power-gated circuitry P are decoupled from the power supply in response to SM(P).

5. The method of claim 2, wherein a clock signal is de-gated from circuits distributing the clock signal within the power-gated circuitry P in response to SM(P).

6. The method of claim 1, wherein the wake-up signal W(P) is generated by decoding instructions ahead of their dispatch for execution to determine when to generate the wake-up signal W(P) for the power-gated circuitry P.

7. The method of claim 1, wherein the estimated time K(P) is determined by analyzing a history of usage of the power-gated circuitry P of the IC.

8. The method of claim 1, wherein multiple power-gated circuits (1, 2, . . . J), activated concurrently and having assigned times M(1)–M(J) and N(1)–N(J), are assigned combined time values Mp and Np corresponding to the maximum values of M(1)–M(J) and N(1)–N(J), respectively.

9. The method of claim 1, wherein time interval M(P), time interval N(P), the wake-up signal W(P) are received in a non-power-gated controller for power-gated circuitry P.

10. The method of claim 1, wherein the estimated time K(P) for power-gated circuitry P is determined by analyzing a history of time intervals between receipt of the wake-up signal W(P) for power-gated circuitry P.

11. A integrated circuit (IC) with control of static and dynamic power dissipation comprising:
   circuitry for generating, for power-gated circuitry P within the IC, an activate time M(P) and a wait time N(P);
   circuitry for generating, for the power-gated circuitry P, a wake-up signal W(P) and an estimated time K(P) following receipt of the wake-up signal W(P); and
   a non-power-gated controller for initiating wake-up of the power-gated circuit P in response to the wake-up signal W(P) and generating sleep mode signals SM(P) for each power-gated circuit P in response to the times, M(P), N(P), and K(P).

12. The IC of claim 11, wherein the non-power gated controller further comprises:
   circuitry for determining the sum of the times M(P)+N(P); and
   compare circuitry for determining whether K(P) is greater than M(P)+N(P).

13. The IC of claim 12, wherein the sleep mode signal SM(P) is generated for the power-gated circuitry P after the time M(P) if K(P) is greater than a time equal to M(P)+N(P) and generating SM(P) for the power-gated circuitry P after a time equal to M(P)+N(P) if K(P) is less than a time equal to M(P)+N(P) and a next successive wake-up signal following W(P) has not been received.

14. The IC of claim 11, wherein the time M(P) is a time required for the power-gated circuitry P to fully activate, to generate a computational result, and to report the computational result to succeeding circuitry.

15. The IC of claim 11, wherein the time interval N(P) is a predetermined time that the power-gated circuitry P should remain ON following receipt of a wake-up signal W(P) to assure a desired performance level.

16. The IC of claim 11, wherein one or more power rails supplying power from a power supply to the power-gated circuitry P are decoupled from the power supply in response to SM(P).

17. The IC of claim 12, wherein a clock signal is de-gated from circuits distributing the clock signal within the power-gated circuitry P in response to SM(P).

18. The IC of claim 11, wherein W(P) is generated by decoding instructions ahead of their dispatch for execution to determine when to generate W(P) for the power-gated circuitry P.

19. The IC of claim 11, wherein the estimated time K(P) is determined by analyzing a history of usage of the power-gated circuitry P of the IC.

20. The IC of claim 11, wherein multiple power-gated circuits (1, 2, . . . J), activated concurrently and having assigned times M(1)–M(J) and N(1)–N(J), are assigned combined time values Mp and Np corresponding to the maximum values of M(1)–M(J) and N(1)–N(J), respectively.

21. The system of claim 11, wherein the estimated time K(P) for power-gated circuitry P is determined by analyzing a history of time intervals between receipt of the wake-up signal W(P) for power-gated circuitry P.

* * * * *